UNITED STATES PATENT OFFICE.

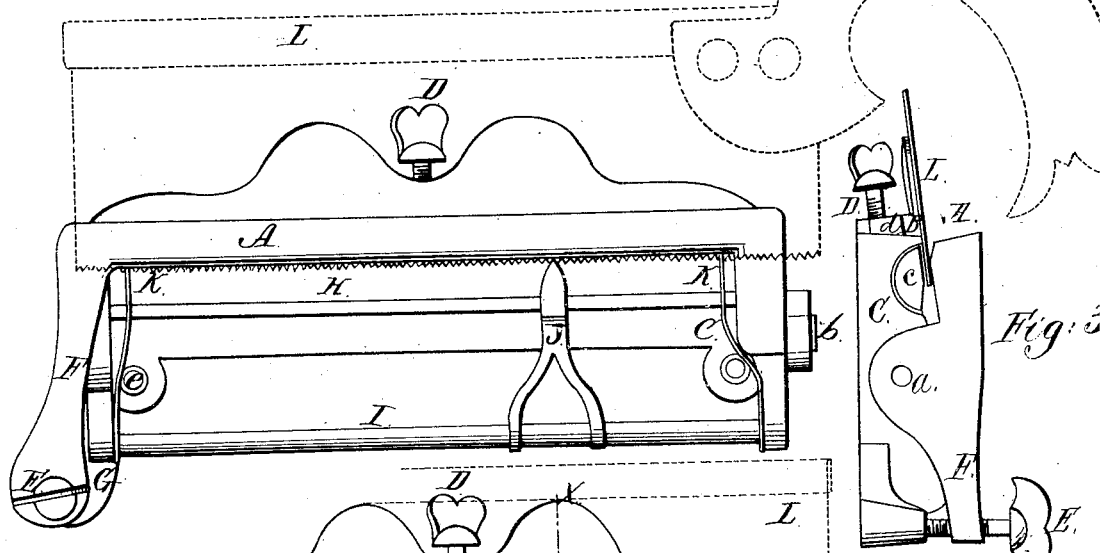
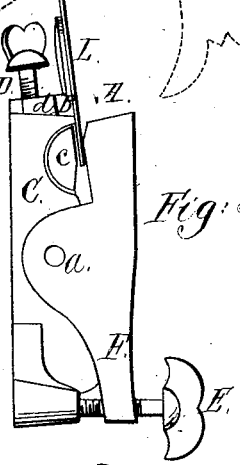
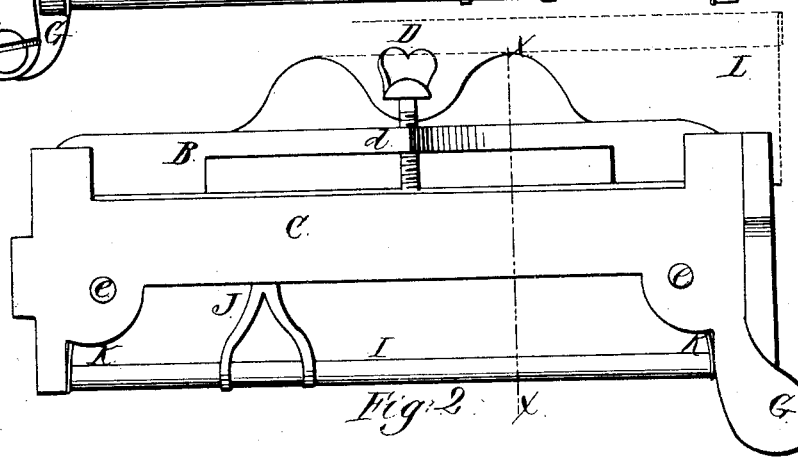
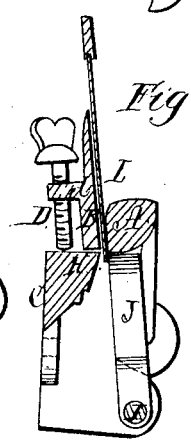
A. G. Bachelder.
Saw-Set.
Nº 8,953.   Patented May 18, 1852.

ASAHEL G. BACHELDER, OF LOWELL, MASSACHUSETTS.

SAW-SET.

Specification of Letters Patent No. 8,953, dated May 18, 1852.

*To all whom it may concern:*

Be it known that I, ASAHEL G. BACHELDER, of Lowell, in the county of Middlesex and State of Massachusetts, have invented a new and useful Improvement in Saw-Sets; and I do hereby declare that the same is described and represented in the following specification and accompanying drawings.

The nature of my invention consists in placing a dog or set upon a rod or bar (connected at the ends to a stock) in such a manner that when the saw is secured in the stock this dog or set may slide or traverse on the rod in a line parallel to the toothed edge of the saw, and turning on the rod may be raised and moved forward to be applied to the alternate teeth in succession so as to give them the required set by a stroke upon the dog or setting tool.

To enable others skilled in the art to make and use my invention I will proceed to describe its construction and the manner in which it is used referring to the abovementioned drawings in which the same letters indicate like parts in all the figures.

Figure 1 is a front view of the instrument; Fig. 2 a view from the opposite or back side; Fig. 3 is an end view and Fig. 4 a transverse vertical section through the line X X of Fig. 2.

A and B are two jaws attached to the stock C—the jaw B has half round bearings *c* at each end fitting into corresponding cavities in the stock C and its inclination is regulated by the set screw D in the projection *d*—the jaw A is connected to the stock C by the pivots *a* and *b* and is made to press toward the jaw B by means of the thumb screw E in the shank F so as to hold the saw L firmly between the two jaws.

I is a rod having its ends fastened in projections on the stock C and on it slides or traverses the dog or set J, the rod passing through circular openings in its forked end.

H is an inclined bed (the inclination being somewhat exaggerated in the figure for the sake of clearness) attached to and forming part of the stock and lying under the teeth of the saw when it is adjusted in the stock, and K, K are gages to aid in adjusting the saw.

To set the saw it is first placed between the jaws A and B as seen in Figs. 1, 3 and 4, the two gages K, K fitting between the teeth and allowing only the teeth or at most but a very narrow portion of the plate to project beyond the edge of the jaw A. The saw is then secured in its position by turning the screw E and the set J being placed upon a tooth a blow is given it with a hammer so as to bend the tooth back against the bed H and this operation is performed upon every other tooth by sliding the set along the rod I. The alternate teeth being thus set the saw is then reversed in the jaws and the teeth before omitted are now treated in a similar manner, the exact set to be given being determined by the adjustment of the jaw B; for by referring to Fig. 4 it will be seen that the greater the backward inclination of this jaw is, the greater will be the set given to the teeth.

The advantage of my saw set over others consists in the facility and precise uniformity of position with which the set J may be applied to the different teeth in succession by sliding it along the rod I and the even and regular set given to the teeth as each one in its turn is bent down so as to press upon the straight bed H.

What I claim as my invention and desire to secure by Letters Patent is—

The dog or set J, so constructed and arranged as to traverse or slide upon a rod or bar in a direction parallel to the toothed edge of the saw for the purpose of setting the same, substantially as described.

In testimony whereof, I have hereunto signed my name before two subscribing witnesses.

A. G. BACHELDER.

Witnesses:
 DANIEL S. RICHARDSON,
 WILLIAM A. RICHARDSON.